April 11, 1944.  A. J. QUINN  2,346,507
GEAR CONSTRUCTION
Filed July 15, 1943  2 Sheets-Sheet 1
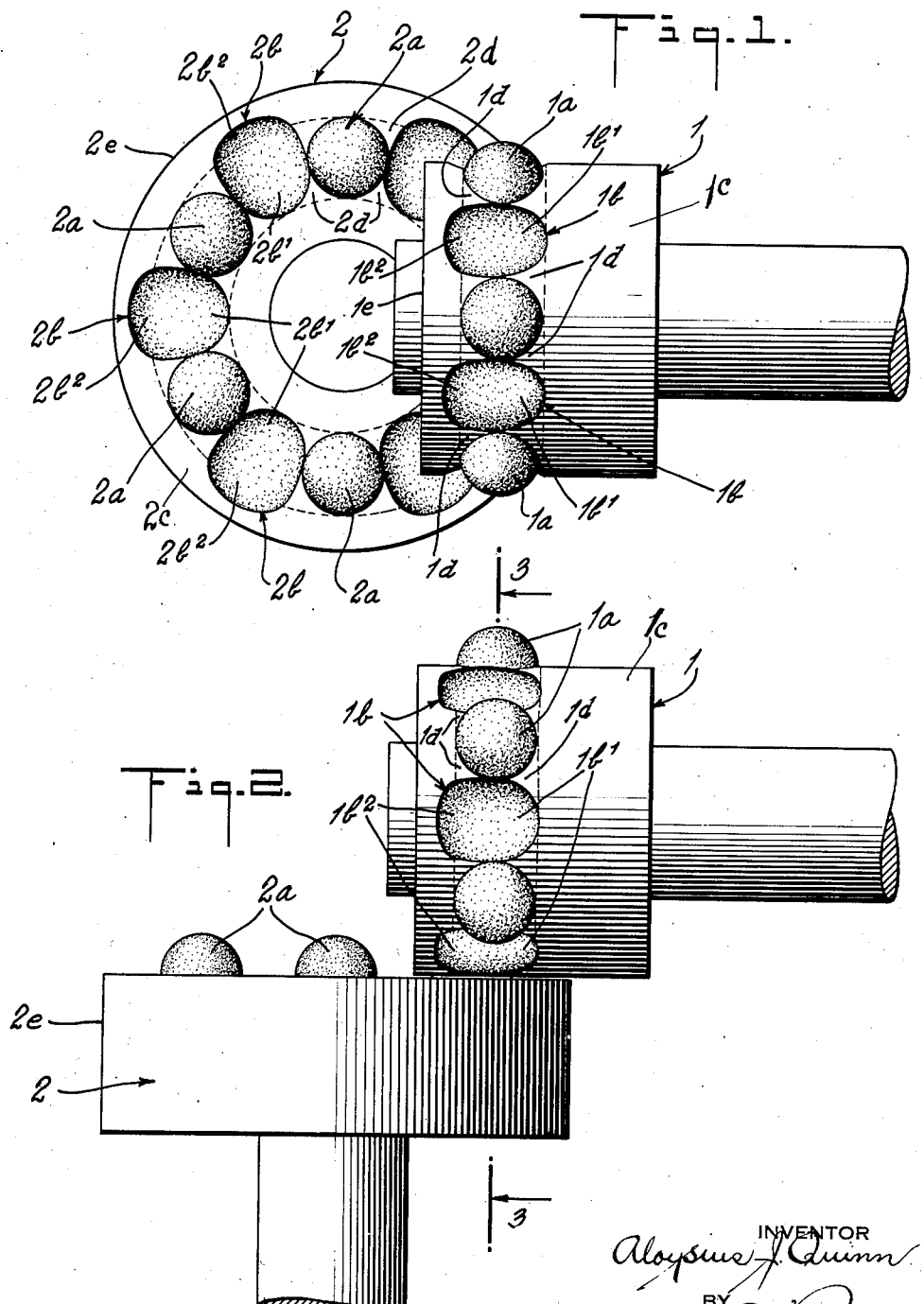
INVENTOR
Aloysius J. Quinn
BY
Joseph F. O'Brien
ATTORNEY April 11, 1944.  A. J. QUINN  2,346,507
GEAR CONSTRUCTION
Filed July 15, 1943  2 Sheets-Sheet 2

Patented Apr. 11, 1944

2,346,507

UNITED STATES PATENT OFFICE 2,346,507

GEAR CONSTRUCTION

Aloysius J. Quinn, North Bergen, N. J., assignor to Brooks Equipment Corp., a corporation of New York Application July 15, 1943, Serial No. 494,781

4 Claims. (Cl. 74—416)

This invention relates to improvements in gear construction, and has particular reference to paired gears having semi-spherical teeth or projections for transmitting rotary motion at an angle of ninety (90) degrees.

An object of my invention is to provide a pair of opposed gears, one having a gear-track on a flat surface and the other having a gear-track on a circumferential surface, each of said gear members being provided with semi-spherical projecting teeth and alternating mating depressions, disposed in right-angular relationship to the teeth on opposed gear member and so arranged that an intermeshing relationship of highly satisfactory character will be produced; increased intermeshing area or overlap of intermeshing elements over present angularly-positioned semi-spherical gears or in conventional involute bevel gears now used will be provided; the gears will be much stronger than conventional toothed gearing; will be more durable; will provide greater wearing qualities; will have a more uniform intermeshing relationship than conventional gears at all positions relatively to each other, and will provide for more efficient power-transmission than conventional gears.

Another object of my invention is to provide a gear construction of the type specified in which toothed track surfaces will have a sufficient overlap to insure increased and more satisfactory interengagement of alternately arranged semi-spherical teeth and mating depressions on the said overlapping surfaces.

Another object is to provide a gear assembly in which similar semi-spherical projecting teeth on opposing members will deeply and alternately intermesh with sockets on the opposed gear member and in which a semi-spherical tooth of one of such members will, in a transmitting movement, be completely engaged, hugged or embraced in a socket on the other opposed member.

Another object is, in a gear assembly having alternating semi-spherical projecting teeth and sockets of the type specified, to provide a construction in which a meshing-engagement of more than a single tooth will be produced at all positions of rotation of the gears; to provide mating depressions or sockets of spheroidal conformation preferably comprising a semi-spherical body portion and shoulder portions of elliptical contour that will enable closer positioning of the intermeshing surfaces and also enable simultaneous initial-or-entering together with end-or-leaving engagements of alternate elements on both or opposite sides of a completely engaged tooth, thus providing increased intermeshing area over bevel gears of conventional type and over other semi-spherical gears when disposed at a 90° angle and also providing for a balanced and uniform distribution of stress in the power-transmission function of the gear assembly.

I attain these objects by the devices illustrated in the accompanying drawings, in which:

Fig. 1 is a plan view of a pair of gears embodying my invention;

Fig. 2 is a side elevation of the gears shown in Fig. 1;

Figure 3:
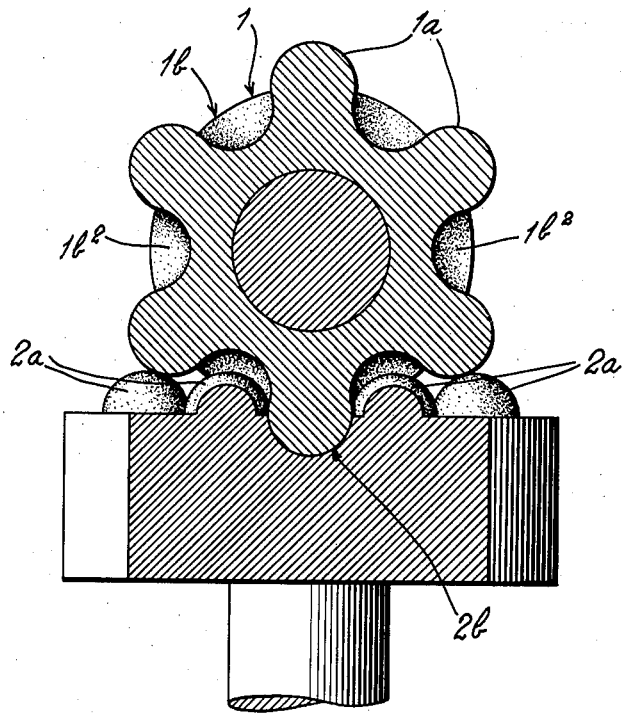
Fig. 3 is a section on the line 3—3 of Fig. 1.
Figure 4:
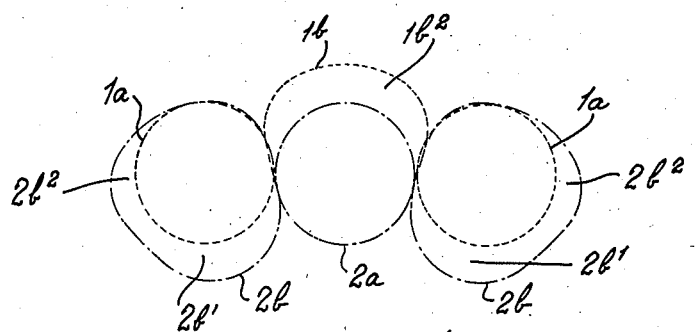
Fig. 4 is a detail view showing the positions of the three semi-spherical teeth and mating depressions.

Referring now to these drawings 1 indicates a cylindrical pinion gear having teeth 1a and depressions 1b on a circumferential or peripheral working or engaging surface 1c and 2 a disc-shaped driven gear having similar semi-spherical teeth 2a and depressions 2b on its top flat surface 2c. The teeth on the pinion gear 1 are disposed on the peripheral surface 1c in a ring, circular band or track 1d disposed back or inward of the edge 1e and in concentric relationship and parallel to the axis of rotation of the gear and of the shaft 3 and the teeth of the driven gear 2 are arranged on a flat track or band 2d completely on the flat surface and inward of the peripheral edge 2e of the gear 2 and are disposed in concentric relationship to the axis of rotation of the gear and of the shaft 4, and at a right angle thereto.

In the preferred embodiment of my invention, the said cylindrical toothed working surface of the pinion gear 1 and the flat toothed working surface of the driven gear 2 overlap each other a substantial distance and, as shown, the peripheral cylindrical surface of the gear 1 overhangs the flat top surface of the disc-shaped gear 2, so as to extend over the circular flat track or band and is positioned in closely adjacent position, so that the flat surface of the disc-shaped gear is disposed in tangential relationship to and almost touching the cylindrical surface of the pinion gear 1, thus providing a maximum working depth and a minimum clearance between the working gear surfaces. At least one engaged semi-spherical tooth on the circumferential peripheral surface of the pinion gear 1, will enter a mating depression in the driven gear to substantially the full depth of the said tooth and I provide for additional engagement and intermeshing area of the teeth by positioning the semi-spherical teeth and depressions on each of the gears close together and providing entering and leaving channels 2b2 merging with mating depressions having semi-spherical body portions 2b1 and thus causing said depressions to have a substantially spheroidal conformation disposed completely within the surfaces in which these mating depressions are located. In this way, I am enabled greatly to increase the area of intermeshing contact of my gear teeth and depressions over the gear teeth and depressions on conventional bevel gears or the like. For example, I cause a tooth-overlap in which one tooth will be completely engaged, intermeshed or embraced while an adjacent tooth and depression on one side of said completely-engaged or intermeshed tooth have an initial or entering engagement and the adjacent tooth on the other side will have a leaving or end engagement. Also, in another position of rotation, two adjacent teeth on the members will have major portions thereof engaged in mating depressions.

In the embodiment of my invention shown, the projecting teeth are completely semi-spherical and the mating depressions have a substantially semi-spherical body portion of slightly larger area than the semi-spherical tooth which it is to receive and shoulder portions merging therewith to cause the combined shape to be spheroidal and to have a semi-elliptical shoulder portion merging with a semi-spherical body portion and extending on the disc-shaped gear radially outward beyond the circular track formed by the projecting semi-spherical teeth on said disc-gear and outwardly toward the outer end or edge of the cylindrical pinion gear. This semi-elliptical shoulder portion will permit a working engagement or intermeshing during entrance and leaving of teeth on opposite sides of a tooth which is engaged to its maximum depth and will provide increased intermeshing area for this type of gear over gears of conventional type, and an intermeshing relationship of highly satisfactory character will be produced; increased intermeshing area or overlap of intermeshing elements over present angularly-positioned semi-spherical gears or in conventional involute bevel gears now used will be provided; the gears will be much stronger than conventional toothed gearing; will be more durable; will provide greater wearing qualities; will have a more uniform intermeshing relationship than conventional gears at all positions relatively to each other, and will provide for more efficient power-transmission than conventional gears. Also, I provide a gear construction of the type specified in which toothed-track surfaces will have a sufficient overlap to insure increased and more satisfactory interengagement of alternately arranged semi-spherical teeth and mating depressions on the said overlapping surfaces. Furthermore, I provide a gear assembly in which similar semi-spherical projecting teeth on opposing members will deeply and alternately intermesh with sockets on the opposed gear member and in which a semi-spherical tooth of one of such members will, in a transmitting movement, be completely engaged, hugged or embraced in a socket on the other opposed member. A gear assembly is also provided having alternating semi-spherical projecting teeth and sockets of the type specified, arranged (a) to provide a construction in which a meshing-engagement of more than a single tooth will be produced at all positions of rotation of the gears and (b) to provide mating depressions or sockets of spherical conformation preferably comprising semi-spherical body portion and shoulder portions of elliptical contour that will enable closer positioning of the intermeshing surfaces and also enable simultaneous initial-or-entering together with end-or-leaving engagements of alternate elements on both or opposite sides of a completely engaged tooth. Thus I provide increased intermeshing area over bevel gears of conventional type and over other semi-spherical gears when disposed at a 90° angle and also provide for a balanced and uniform distribution of stress in the power-transmission function of the gear assembly.

In operation, the shoulder portion of each mating depression which is substantially semi-elliptical in shape or contour, enables the working engagement of the semi-spherical tooth on entry at one side of the axis of the depression, the subsequent movement of the said semi-spherical tooth into the semi-spherical body portion of said mating depression to provide proper intermeshing contact therewith and the further working contact or intermeshing of the said tooth on leaving the depression at the opposite side of the axis thereof, so that in effect each tooth operates in a mating depression which comprises a cam-groove corresponding primarily in its body-portion to the shape of the tooth and in its shoulder portions to entering and leaving cam-grooves which provide a semi-spheroidal shape composed of a semi-spherical body portion and shoulder portions having together a regular elliptical contour. Obviously, the gears may be turned in either direction without any change whatever. In case turning movement of the gears is reversed, the terms "leaving" and "entering" would also, of course, be reversed.

Having described my invention, I claim:

1. A gear assembly embodying, in combination, a pair of overlapping gears, comprising two members one having a disc-like flat surface at substantially a right angle to its axis of rotation and the other having a substantially circular peripheral surface, each of said members having substantially semi-spherical projecting teeth and alternate mating depressions of substantially semi-spheroidal shape.

2. A gear assembly embodying, in combination a pair of overlapping gears, comprising two members one having a flat disc-like surface at substantially a right angle to its axis of rotation and the other having a substantially circular peripheral surface, each of said members having substantially semi-spherical projecting teeth and alternate mating depressions of substantially semi-spheroidal shape, said semi-spheroidal depressions each comprising a body portion of semi-spherical shape and channels merging therewith at one end to permit entering and leaving engagements with the semi-spherical projecting teeth.

3. A gear assembly embodying, in combination, a pair of overlapping gears, comprising two members one having a flat disc-like surface at substantially a right angle to its axis of rotation and the other having a substantially circular peripheral surface, each of said members having substantially semi-spherical projecting teeth and alternate mating depressions of generally semi-spheroidal shape having shoulder channels adapted to permit initial and leaving engagements of the semi-spherical projecting teeth, said shoulder-channels being positioned outside of the track line of said semi-spherical teeth.

4. A gear assembly embodying, in combination, a pair of overlapping gears, comprising two members one having a flat disc-like surface at substantially a right angle to its axis of rotation and the other having a substantially circular peripheral surface, each of said members having substantially semi-spherical projecting teeth and alternate mating depressions of generally semispheroidal shape having shoulder channels adapted to permit initial and leaving engagements of the semi-spherical teeth, said shoulder channels being positioned outside of the track line of said semi-spherical teeth, and together forming a depression portion of substantially semi-elliptical contour.

ALOYSIUS J. QUINN.